March 11, 1958  A. D. NEWMAN  2,826,463
BEARINGS

Filed March 1, 1955  2 Sheets-Sheet 1

United States Patent Office 2,826,463
Patented Mar. 11, 1958

2,826,463
BEARINGS

Arthur Derek Newman, Whitley Bay, England, assignor to The Parsons and Marine Engineering Turbine Research and Development Association, Wallsend, England Application March 1, 1955, Serial No. 491,398

Claims priority, application Great Britain April 20, 1954

3 Claims. (Cl. 308—76)

This invention relates to sliding bearings, e. g. journal bearings and thrust bearings.

In an oil-lubricated bearing of the usual type the frictional losses in the bearing are largely due to shearing of the oil film between the two relatively-moving surfaces. These frictional losses appear as heat, which must be removed to prevent the bearing from overheating. This removal of heat is done mainly by the oil flow through the bearing which has largely been the origin of its generation.

The object of the present invention is to provide improved forms of bearings in which the functions of lubricating and cooling of the working fluid, i. e., lubrication and cooling, are separated.

The invention consists in a sliding bearing having features as set forth in the claims appended hereto.

Figure 1:
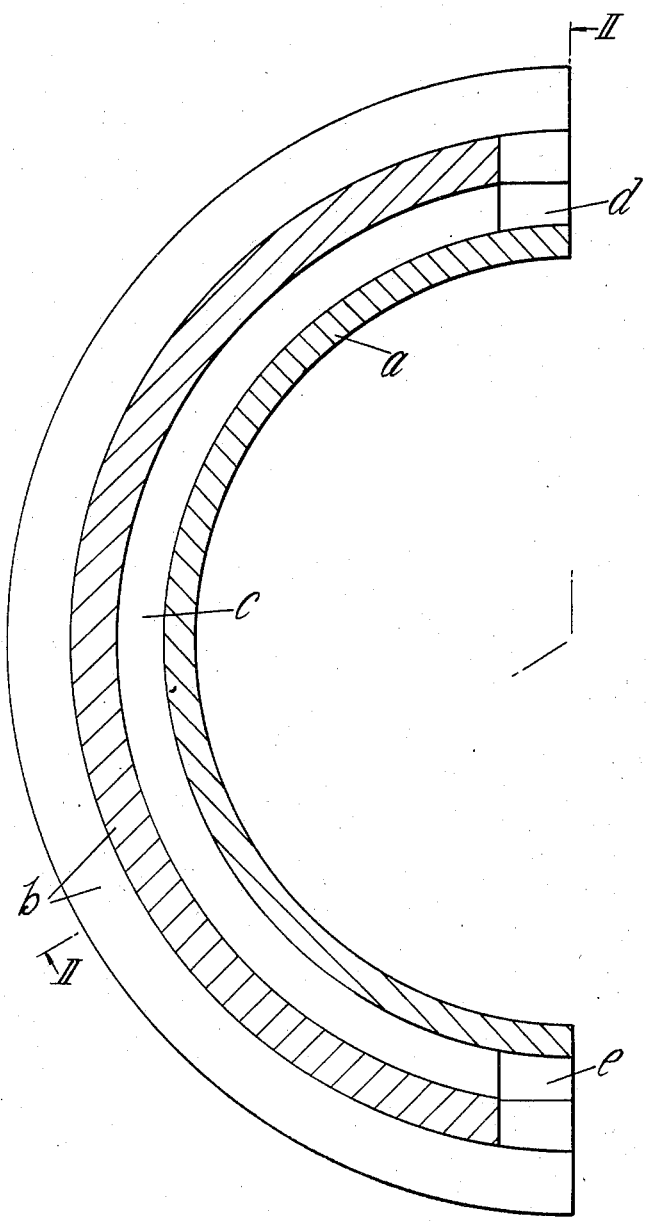
Figure 2:
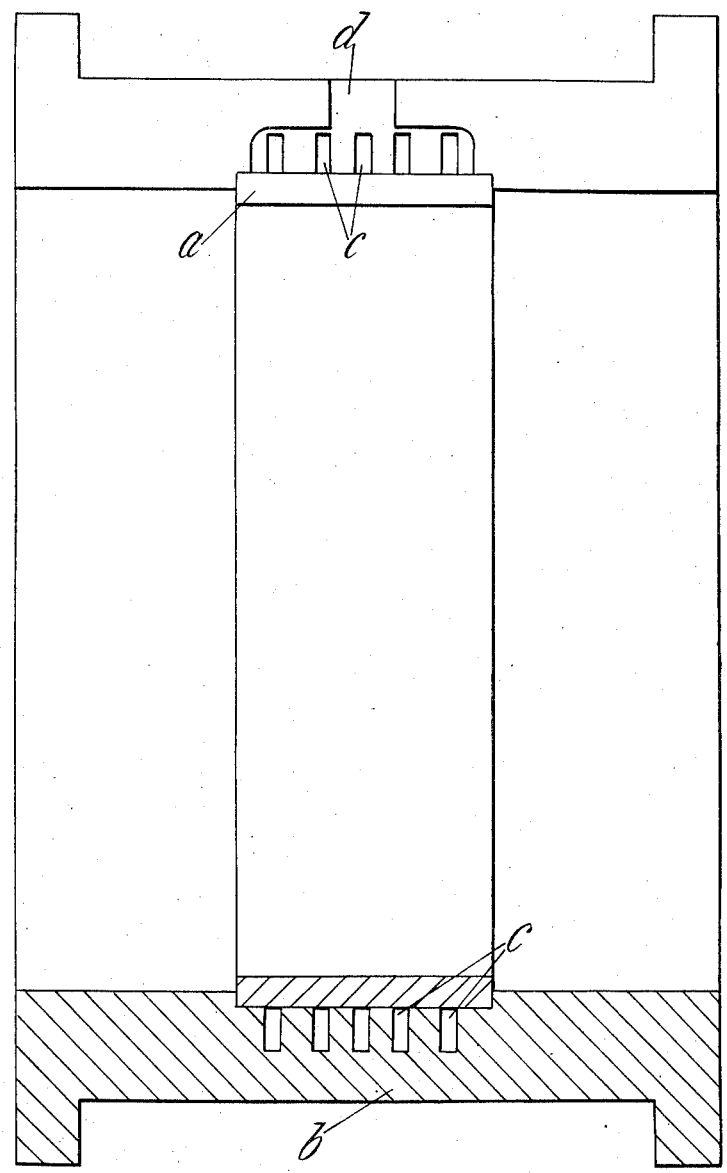

Referring to the accompanying diagrammatic drawings:

Figure 1 is a vertical half section through a bearing embodying the present invention, and Figure 2 is a sectional elevation thereof on the line II—II of Figure 1.

In carrying the invention into effect according to one convenient example illustrated in Figure 1 and Figure 2 of the drawings, as applied to a journal bearing, two bearing surface members are provided composed of metal having satisfactory inherent frictional properties. Each bearing surface member $a$ composed of porous material, viz., sintered metal and is supported in a bearing casing $b$ furnished with one or a plurality of annular ducts $c$ communicating at the top of the casing with a coolant supply cavity $d$ and communicating at the bottom with a coolant drainage cavity $e$.

Means are provided for continuously supplying coolant liquid, preferably having lubricating properties, to the annular ducts $c$ by way of the cavity $d$ whereby the exterior of the bearing surface members $a$ adjacent to the ducts are washed by liquid, thereby cooling the bearing surface members $a$.

In addition to cooling, lubrication is also achieved by capillary flow of a relatively small proportion of the lubricant through the porosities of the bearing surface member.

According to a modification, a solid lubricant, e. g. molybdenum disulphide is applied to or is contained in the bearing surface member; in this case the cooling medium does not need to have lubricating properties.

I claim:

1. A sliding bearing comprising a supporting casing member having an annular groove, a plurality of annular ducts in the bottom wall of the said groove, a common inlet and common outlet passage communicating with all said ducts, a bearing sleeve member fitting in the said groove and against the bottom thereof between ducts, the said bearing sleeve member being porous and substantially homogeneous, and a lubricating and coolant liquid filling the said ducts and passages and the porosities in the said bearing sleeve member.

2. A sliding bearing as claimed in claim 1 wherein said porous bearing sleeve comprises sintered metal.

3. A sliding bearing as claimed in claim 1 wherein said porous bearing surface has applied thereto solid lubricant molybdenum disulphide.

References Cited in the file of this patent

UNITED STATES PATENTS

| | | |
|---|---|---|
| 414,221 | Hyde | Nov. 5, 1889 |
| 2,196,388 | Ewald | Apr. 9, 1940 |
| 2,217,295 | Scott-Paine | Oct. 8, 1940 |
| 2,516,021 | Samzelius | July 18, 1950 |
| 2,573,597 | Paden | Oct. 30, 1951 |
| 2,645,534 | Becker | July 14, 1953 |

FOREIGN PATENTS

| | | |
|---|---|---|
| 710,595 | Germany | Sept. 17, 1941 |
| 677,240 | Great Britain | Aug. 13, 1952 |
| 704,035 | Great Britain | Feb. 17, 1954 |
| 704,761 | Great Britain | Mar. 3, 1954 |
| 706,795 | Great Britain | Apr. 7, 1954 |